United States Patent
Barker et al.

(10) Patent No.: US 10,753,221 B2
(45) Date of Patent: Aug. 25, 2020

(54) SEAL ASSEMBLY WITH DUCTILE WEAR LINER

(71) Applicant: United Technologies Corporation, Farmington, CT (US)

(72) Inventors: William M. Barker, North Andover, MA (US); Thomas E. Clark, Sandford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 29 days.

(21) Appl. No.: 16/217,402

(22) Filed: Dec. 12, 2018

(65) Prior Publication Data
US 2020/0191007 A1 Jun. 18, 2020

(51) Int. Cl.
*F01D 11/08* (2006.01)

(52) U.S. Cl.
CPC .......... *F01D 11/08* (2013.01); *F05D 2240/11* (2013.01); *F05D 2240/56* (2013.01); *F05D 2300/16* (2013.01); *F05D 2300/6033* (2013.01); *F23R 2900/00012* (2013.01)

(58) Field of Classification Search
CPC ........ F01D 11/08; F01D 11/12; F01D 11/122; F01D 11/125; F01D 11/127
See application file for complete search history.

(56) References Cited

U.S. PATENT DOCUMENTS

| | | | |
|---|---|---|---|
| 5,074,748 A | 12/1991 | Hagle | |
| 6,142,731 A * | 11/2000 | Dewis | F01D 11/08 277/416 |
| 6,170,831 B1 | 1/2001 | Bouchard | |
| 7,726,936 B2 * | 6/2010 | Keller | F01D 11/12 415/173.4 |
| 8,475,695 B2 | 7/2013 | Carper et al. | |
| 8,740,552 B2 * | 6/2014 | Marusko | F01D 9/04 415/173.1 |
| 9,500,083 B2 | 11/2016 | Cairo et al. | |
| 9,598,975 B2 * | 3/2017 | Uskert | F01D 11/24 |
| 9,963,990 B2 | 5/2018 | Vetters et al. | |
| 2004/0033105 A1 | 2/2004 | North | |

(Continued)

OTHER PUBLICATIONS

European Search Report for European Patent Application No. 19215670.1 completed 24 Apr. 2020.

*Primary Examiner* — Michael Lebentritt
*Assistant Examiner* — Topaz L. Elliott
(74) *Attorney, Agent, or Firm* — Carlson, Gaskey & Olds, P.C.

(57) ABSTRACT

A seal assembly for a gas turbine engine according to an example of the present disclosure includes, among other things, a seal that has a seal body extending circumferentially between opposed mate faces and at least one rail extending outwardly from the seal body. The seal body has a seal face that bounds a gas path. At least one rail aperture is defined at least partially through the at least one rail. At least one wear liner has a liner body. The liner body defines a liner aperture and an outer periphery that mates with the at least one rail aperture. A seal support is mountable to an engine case. The seal support has at least one support hook that mates with the liner aperture to mount the seal to the seal support. A method of assembly for a gas turbine engine is also disclosed.

20 Claims, 6 Drawing Sheets

(56) References Cited

U.S. PATENT DOCUMENTS

| | | | |
|---|---|---|---|
| 2007/0031258 A1 | 2/2007 | Campbell et al. | |
| 2008/0178465 A1 | 7/2008 | Schiavo et al. | |
| 2010/0047061 A1 | 2/2010 | Morrison | |
| 2014/0030072 A1* | 1/2014 | Hillier | F01D 5/284 415/173.1 |
| 2014/0127006 A1* | 5/2014 | Romanov | F01D 25/246 415/173.1 |
| 2014/0271144 A1* | 9/2014 | Landwehr | F01D 25/246 415/173.1 |
| 2014/0271147 A1* | 9/2014 | Uskert | F01D 11/22 415/173.2 |
| 2016/0010482 A1* | 1/2016 | Rogers | F01D 25/246 415/173.1 |
| 2016/0186609 A1 | 6/2016 | Holland et al. | |
| 2016/0186611 A1 | 6/2016 | Vetters et al. | |
| 2017/0044920 A1 | 2/2017 | Vetters et al. | |
| 2017/0145845 A1* | 5/2017 | Vetters | F01D 9/06 |
| 2019/0112947 A1* | 4/2019 | Walston | F01D 25/246 |
| 2019/0264572 A1* | 8/2019 | Walston | F01D 11/20 |
| 2019/0264578 A1* | 8/2019 | Walston | F01D 25/246 |
| 2019/0284958 A1* | 9/2019 | Schilling | F01D 25/246 |
| 2020/0063592 A1* | 2/2020 | Barker | F01D 25/246 |

* cited by examiner

SEAL ASSEMBLY WITH DUCTILE WEAR LINER

BACKGROUND

This disclosure generally relates to positioning of components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged about the blades.

SUMMARY

A seal assembly for a gas turbine engine according to an example of the present disclosure includes a seal that has a seal body extending circumferentially between opposed mate faces and at least one rail extending outwardly from the seal body. The seal body has a seal face that bounds a gas path. At least one rail aperture is defined at least partially through the at least one rail. At least one wear liner has a liner body. The liner body defines a liner aperture and an outer periphery that mates with the at least one rail aperture. A seal support is mountable to an engine case. The seal support has at least one support hook that mates with the liner aperture to mount the seal to the seal support. The at least one support hook is made of a first material, and the liner body is made of a second material that differs in construction from the first material.

In a further embodiment of any of the foregoing embodiments, the first material has a first modulus of elasticity, and the second material has a second modulus of elasticity that is less than the first modulus of elasticity.

In a further embodiment of any of the foregoing embodiments, the at least one rail comprises ceramic, and at least one wear liner is metallic.

In a further embodiment of any of the foregoing embodiments, the at least one wear liner comprises cobalt.

In a further embodiment of any of the foregoing embodiments, the seal is a blade outer air seal (BOAS).

In a further embodiment of any of the foregoing embodiments, the seal has a unitary construction.

In a further embodiment of any of the foregoing embodiments, the seal body and the at least one rail are constructed from a ceramic matrix composite (CMC) including one or more ply layers.

In a further embodiment of any of the foregoing embodiments, the at least one rail aperture includes a plurality of elongated slots that extend through the at least one rail. The at least one rail includes first and second rails each defining a respective one of the plurality of elongated slots. The first material has a first modulus of elasticity, and the second material has a second modulus of elasticity that is between 80 percent and 98 percent of the first modulus of elasticity.

In a further embodiment of any of the foregoing embodiments, the one or more ply layers include a plurality of ply layers, and the elongated slots extend through each of the ply layers defining a respective one of the first and second rails.

In a further embodiment of any of the foregoing embodiments, the liner body includes a first body portion extending from a first flange and a second body portion extending from a second flange. The first body portion defines the outer periphery. The second body portion defines the liner aperture, and the second body portion is at least partially insertable into the first body portion such that the at least one rail is sandwiched between the first and second flanges.

In a further embodiment of any of the foregoing embodiments, the at least one wear liner is a ceramic matrix composite (CMC) comprising one or more ply layers that are each dimensioned to extend about the liner aperture.

A gas turbine engine according to an example of the present disclosure includes an engine case extending along an engine longitudinal axis. An array of blades is rotatable about the engine longitudinal axis. A seal support is mounted to the engine case. The seal support includes a plurality of support hooks. An array of blade outer air seal assemblies are distributed about the array of blades to bound a core flow path. Each of the seal assemblies includes a seal that has a seal body extending circumferentially between opposed mate faces. The seal body has a seal face that bounds the core flow path and an opposed backside face. A plurality of rail apertures are defined in a pair of rails extending outwardly from the backside face. A plurality of wear liners are received between respective ones of the support hooks and surfaces of the rail apertures to mount the seal. The pair of rails are constructed from a ceramic matrix composite (CMC) including a plurality of ply layers that define the rail apertures.

In a further embodiment of any of the foregoing embodiments, the support hooks have a first modulus of elasticity, and the liner body comprises a second material having a second modulus of elasticity that is less than the first modulus of elasticity.

In a further embodiment of any of the foregoing embodiments, the first material has a first modulus of elasticity, and the second material has a second modulus of elasticity that is between 90 percent and 98 percent of the first modulus of elasticity.

In a further embodiment of any of the foregoing embodiments, each of the wear liners is metallic.

In a further embodiment of any of the foregoing embodiments, the rail apertures are a plurality of elongated slots, and the elongated slots extend through each and every one of the ply layers defining a respective one of the pair of rails.

A method of assembly for a gas turbine engine according to an example of the present disclosure includes providing a blade outer air seal (BOAS) that has a seal body extending circumferentially between opposed mate faces and a rail extending outwardly from the seal body. The seal body has a seal face that bounds a gas path. The rail defines a rail aperture, and the rail includes ceramic. The method includes inserting a wear liner into the rail aperture, the wear liner having a liner body that defines a liner aperture, and mounting the blade outer air seal (BOAS) to a seal support, including inserting a support hook of the seal support into the liner aperture such that the wear liner is sandwiched between the support hook and surfaces of the rail defining the rail aperture. The support hooks includes a first material that has a first modulus of elasticity, and the liner body includes a second material that has a second modulus of elasticity that is less than the first modulus of elasticity.

In a further embodiment of any of the foregoing embodiments, the rail is constructed from a ceramic matrix composite (CMC) including a plurality of ply layers that define the rail aperture.

In a further embodiment of any of the foregoing embodiments, the wear liner is metallic.

A further embodiment of any of the foregoing embodiments includes fabricating the wear liner from a ceramic matrix composite (CMC) including a plurality of ply layers that extend about a perimeter of the liner aperture.

The various features and advantages of this invention will become apparent to those skilled in the art from the following detailed description of an embodiment. The drawings that accompany the detailed description can be briefly described as follows.

DETAILED DESCRIPTION

Figure 1:
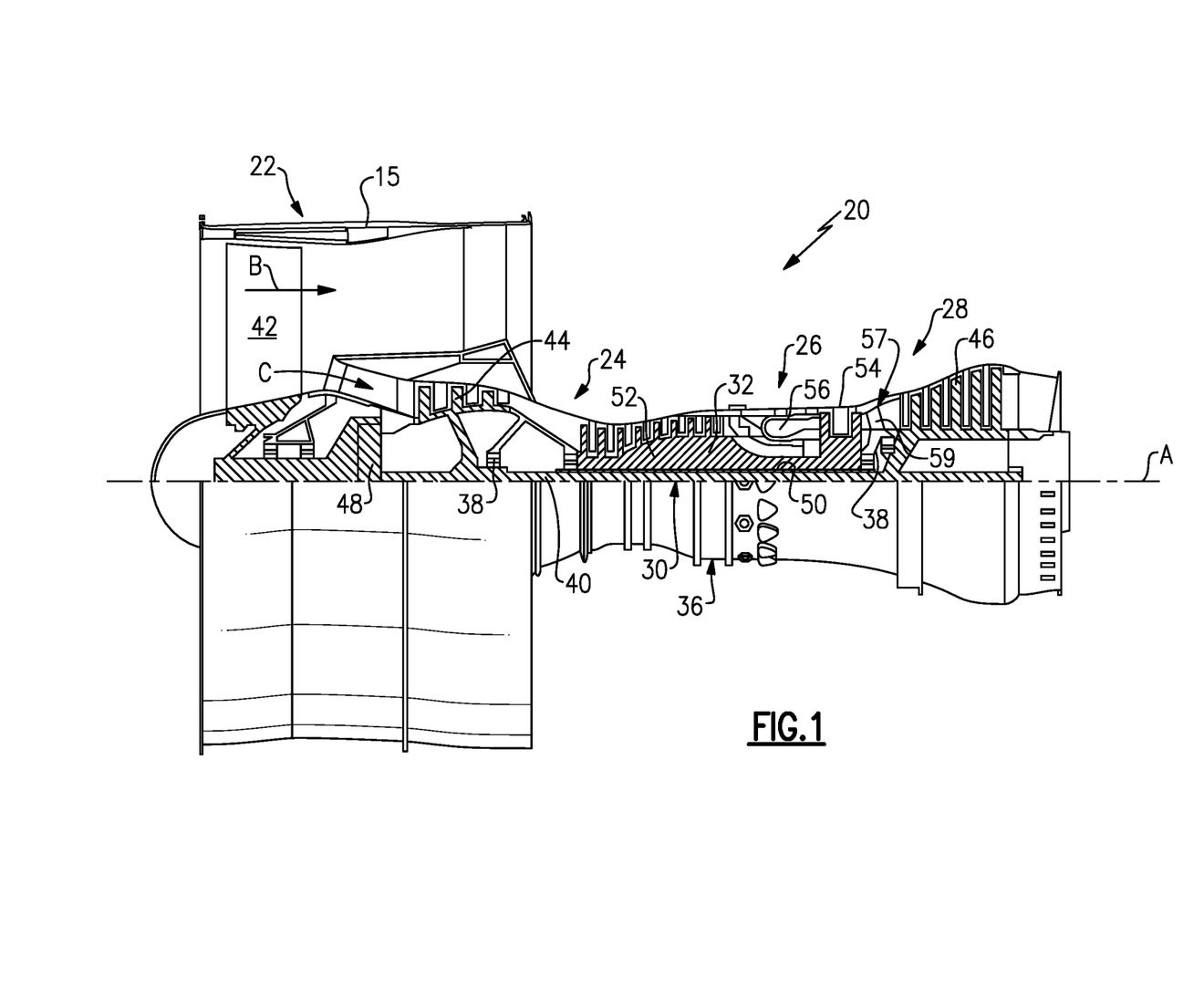
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
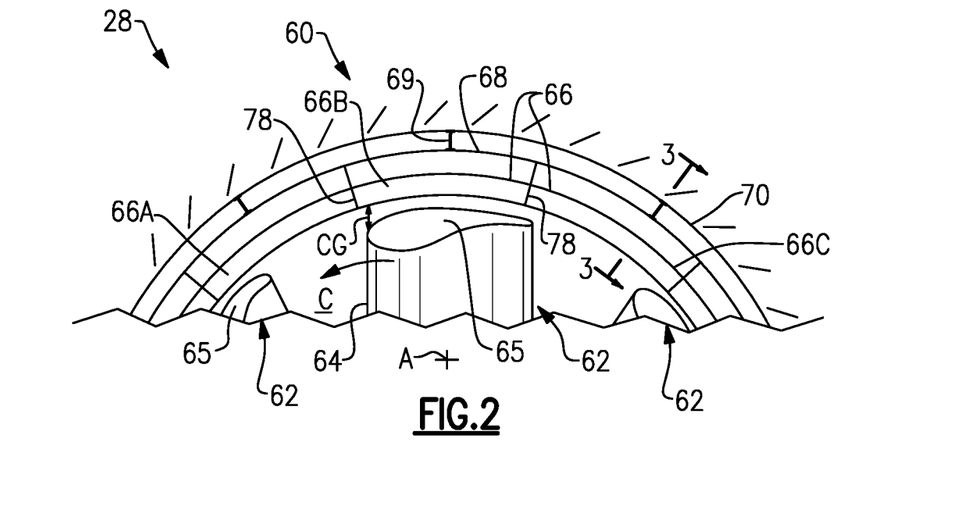
FIG. 2 illustrates an axial view of an example of a blade outer air seal assembly of a gas turbine engine.

FIG. 2 illustrates an axial view through a portion of one of the stages of the turbine section 28. In this disclosure, like reference numerals designate like elements where appropriate and reference numerals with the addition of one-hundred or multiples thereof designate modified elements that are understood to incorporate the same features and benefits of the corresponding original elements. The turbine section 28 includes an annular seal assembly 60 that is located radially outwards of a rotor 62 that has an array or row of rotor blades 64 rotatable about the engine axis A. The seal assembly 60 can alternatively or additionally be adapted for other portions of the engine 20, such as an upstream stage of the compressor section 24, transition ducts, or combustor panels defining portions of a combustion chamber located in the combustor section 26. Although the teachings herein primarily refer to a two spool gas turbine engine having a fan, other systems can benefit from the teachings herein, such as engines with or without a fan, and land-based industrial turbines.

The seal assembly 60 includes one or more seal arc segments or blade outer air seals (BOAS) 66 that are circumferentially arranged in an annulus around the engine axis A (three seals 66 indicated at 66A-66C for illustrative purposes). The seals 66 are mounted to a seal support 68, which may be continuous or segmented. The seal support 68 is mounted through one or more connections 69 to an engine case 70, which is arranged about and extends along the engine axis A. The engine case 70 can be a portion of the engine static structure 36 (FIG. 1).

The array of seals 66 are distributed about the array of blades 64 to bound the core flow path C. The seals 66 are arranged in close radial proximity to the airfoil tips 65 of the blades 64 to reduce the amount of gas flow that escapes around the blades 64 and through clearance gap CG. The engine 20 can include an active or passive clearance control system to adjust the clearance gap CG to a desired dimension during one or more operating conditions of the engine 20. The active or passive clearance control system can be incorporated into the seal support 68, for example.

Each seal 66 can be formed of a material having a high temperature capability. Example high temperature materials include metallic alloys and ceramic-based materials, such as a monolithic ceramic or a ceramic matrix composite (CMC). One example of a high temperature metallic alloy is a nickel-based alloy. Monolithic ceramics may be, but are not limited to, silicon carbide (SiC) or silicon nitride ($Si_3N_4$). Alternatively, each seal 66 may be formed of high-toughness material such as, but not limited to, single crystal metallic alloys.

Figure 3:
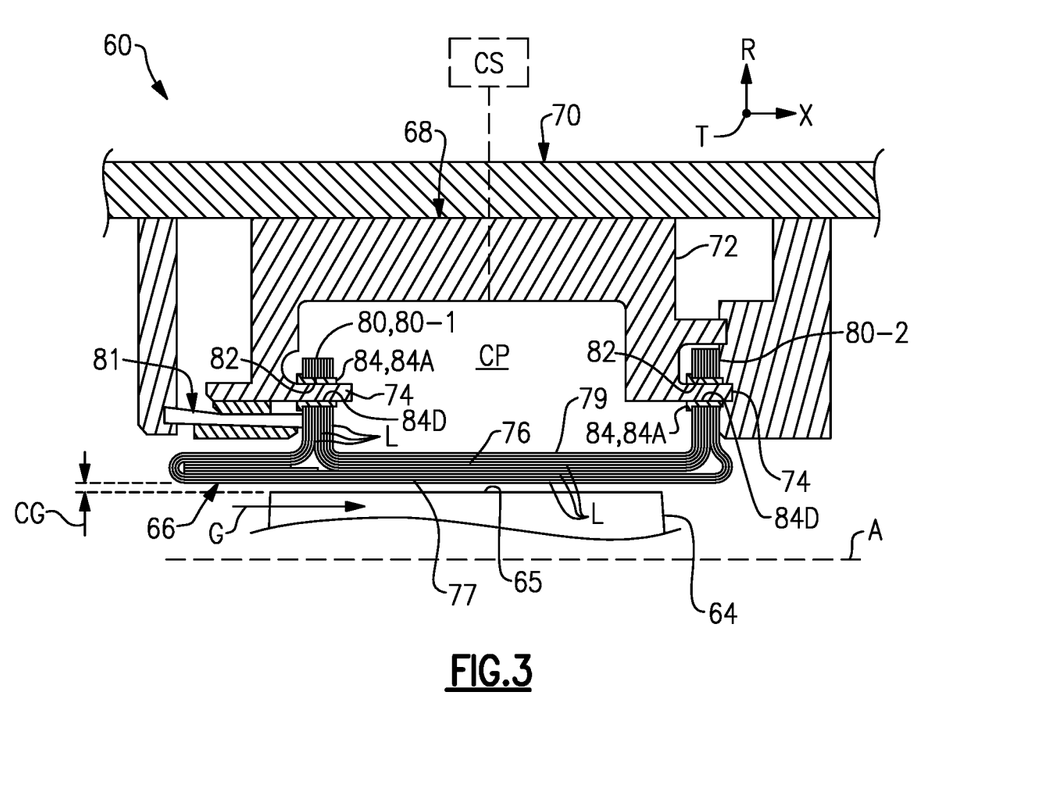
FIG. 3 illustrates an axial cross sectional view of selected portions of the seal assembly taken along line 3-3 of FIG. 2.

Referring to FIG. 3, with continuing reference to FIG. 2, the seal support 68 includes at least a mounting portion 72 that is mechanically attached or otherwise secured to the engine case 70. Various techniques can be utilized to mount the seal support 68 to the engine case 70, such as mechanically attaching the mounting portion 72 with one or more fasteners.

The seal support 68 includes at least one support hook 74 that extends from the mounting portion 72 to mount the respective seal 66. In the illustrated example of FIG. 3, the seal support 68 includes a plurality of support hooks 74 each having a major component that extends in an axial direction X from the mounting portion 72. The support hooks 74 can extend aftwards and can be substantially parallel to the engine longitudinal axis A, for example.

The seal 66 includes a seal body 76 extending circumferentially between opposed mate faces 78 (FIG. 2). The seal body 76 has a generally arcuate seal face 77 that bounds portions of a gas path G, such as the core flow path C (FIG. 1). The seal face 77 is situated in close proximity to airfoil tip 65 to define the clearance gap CG.

The seal body 76 includes a backside face 79 that is opposed to the seal face 77. The backside face 79 cooperates with the seal support 68 to define a cooling cavity or plenum CP. The plenum CP can be dimensioned to receive pressurized cooling flow from a cooling source CS (shown in dashed lines) to cool portions of the seal 66. Example cooling sources CS can include bleed air from an upstream stage of the compressor section 24 (FIG. 1), for example.

Figures 4, 4A:
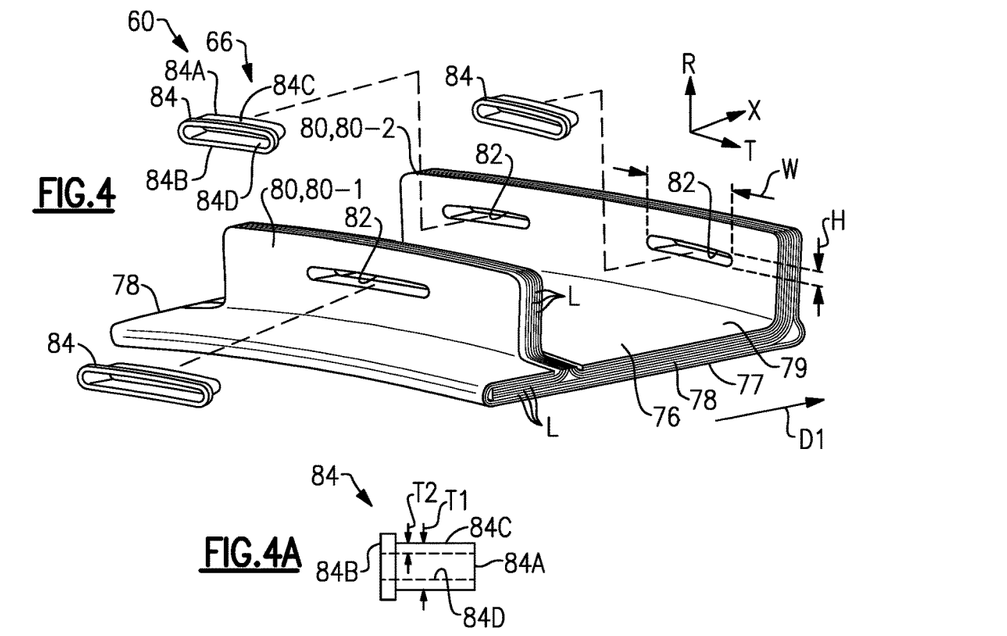
FIG. 4 is an exploded perspective view of a seal and wear liners of the seal assembly of FIG. 3.
FIG. 4A is a side view of one of the wear liners of FIG. 4.
Figure 5:
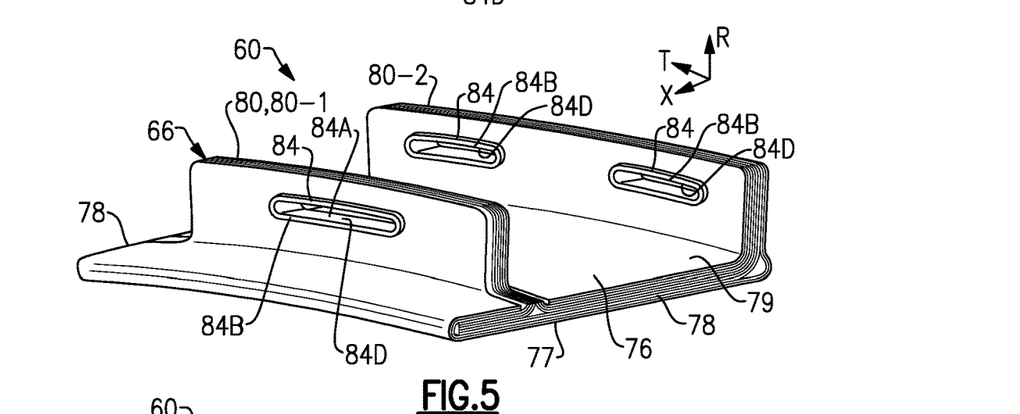
FIG. 5 is a perspective view of the seal of FIG. 3 with the wear liners in an installed position.
Figure 6:
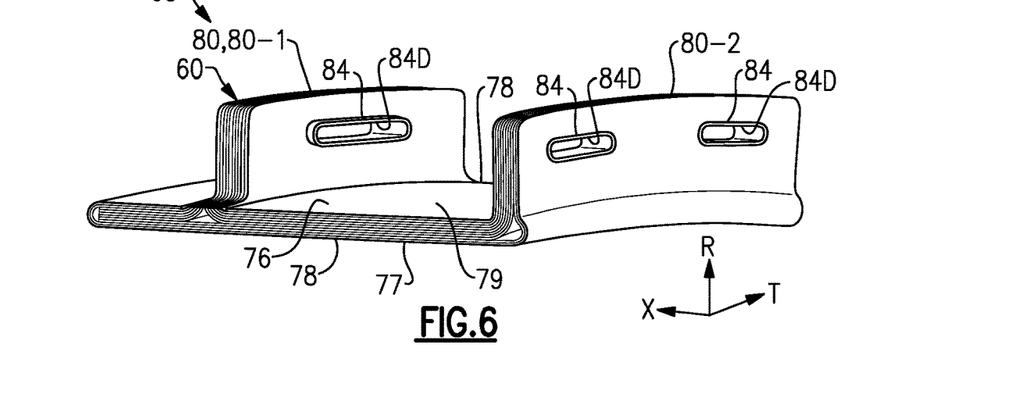
FIG. 6 is another perspective view of the seal of FIG. 5.

Referring to FIGS. 4-6, with continuing reference to FIG. 3, each seal 66 includes at least one rail 80 that is dimensioned to mount the seal 66 to the seal support 68. Each rail 80 extends outwardly from the backside face 79 of the seal body 76 in a radial direction R. In the illustrated example of FIGS. 3-6, the seal 66 includes a pair of first and second rails 80-1, 80-2 each extending in a circumferential or thickness direction T between the mate faces 78. The seal assembly 60 can include at least one brush seal assembly 81 that is arranged to seal against portions of the seal 66, such as one of the rails 80 as illustrated by FIG. 3. The brush seal assembly 81 can include a carrier mounted to the engine case 70.

At least one rail aperture 82 is defined at least partially through each of the rails 80, as illustrated by FIGS. 3 and 4. The rail aperture 82 is dimensioned to receive a respective one of the support hooks 74 to mount the seal 66 to the seal support 68. Each rail 80 can define more than one rail aperture 82. For example, the first rail 80-1 defines a single rail aperture 82, and the second rail 80-2 defines two circumferentially spaced apart rail apertures 82.

Figure 13:
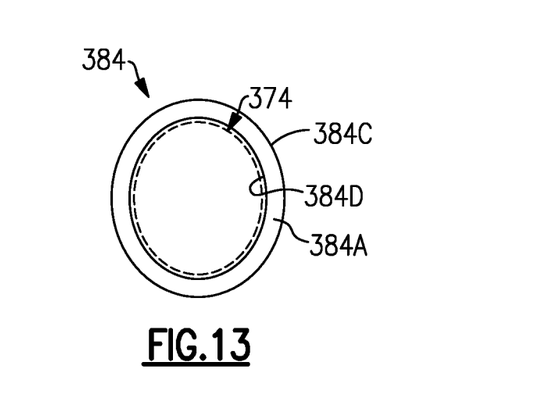
FIG. 13 illustrates a cross section of a wear liner according to another example.

In the illustrated example of FIGS. 3 and 4, each rail aperture 82 extends completely through a respective one of the rails 80 to form a passage having a complementary geometry to the respective support hook 74. In the illustrated examples of FIG. 4, each rail aperture 82 is an elongated slot that complements a generally rectangular cross sectional geometry of the support hook 74. The elongated slots can have rounded corners to reduce stress concentrations. The rail aperture 82 defines a width W and a height H (FIG. 4). An aspect ratio W/H can be between 3:1 and 8:1, such as about 6:1. In other examples, the wear liner and support hook have a generally elliptical geometry, as illustrated by wear liner 384 and support hook (shown in dashed lines) of FIG. 13.

The seal assembly 60 includes at least one grommet or wear liner 84 dimensioned to at least partially space apart and isolate a respective rail 80 and support hook 74 from direct abutment. In the illustrated example of FIGS. 3-6, the seal assembly 60 includes a plurality of wear liners 84 each received in a respective rail aperture 82 received between respective ones of the support hooks 74 and surfaces of the rail aperture 82 to mount the respective seal 66.

Each wear liner 84 includes a liner body 84A that extends from a flange 84B, as illustrated in FIGS. 4 and 4A. The flange 84B is dimensioned to abut against a respective one of the rails 80, as illustrated by FIG. 5. The liner body 84A defines an outer periphery 84C (FIGS. 4 and 4A) that mates with a respective one of the rail apertures 82. The outer periphery 84C can be dimensioned relative to the rail aperture 82 to accommodate manufacturing tolerances and thermal growth of the components during engine operation. Each liner body 84A defines a liner aperture 84D dimensioned to mate with a respective one of the liner apertures 84D to mount the seal 66 to the seal support 68, as illustrated by FIG. 3.

Various materials can be utilized to fabricate the portions of the seal 66, seal support 68 and wear liners 84. In the illustrated examples of FIGS. 3-6, the wear liners 84 are made of a material that is relatively more ductile than portions of the respective support hooks 74 received in the liner apertures 84D. The ductility can improve conformance of the wear liners 84 to thermal deflections of the rails 80 and support hooks 74.

For example, each support hook 74 can be made of a first material and the wear liner 84 including liner body 84A can be made of a second material that differs in construction from the first material. The first material of the support hook 74 has a first modulus of elasticity. The second material of the wear liner 84 has a second modulus of elasticity. The second modulus of elasticity can be less than the first modulus of elasticity such that the wear liner 84 is relatively more ductile than the support hook 74. In some examples, the second modulus of elasticity is between 80% and 98% of the first modulus of elasticity, or more narrowly less than 95% of the first modulus of elasticity. For the purposes of this disclosure, the moduli of elasticity are calculated prior to assembly. Each wear liner 84 can be made of a metallic material, including a high temperature metal or alloy such as a cobalt-based superalloy or another alloy having a relatively low nickel content (e.g., less than 1-2% nickel). Fabricating the wear liner 84 from cobalt-based materials can reduce wear of the seals 66 and/or support hooks 74. In other examples, the wear liner 84 is made of a high temperature composite material comprising carbon or thermoplastic. The wear liner 84 can be sheet metal formed to a geometry of the rail aperture 82. In other examples, the wear liner 84 is cast, molded and/or machined.

The wear liner 84 can be relatively compliant to distribute loads between the support hooks 74 and seal 66. The outer periphery 84C of the liner body 84A can define a first thickness T1 and a wall of the liner body 84A can define a second thickness T2, as illustrated in FIG. 4A. In some examples, the second thickness T2 is less than 25% of the first thickness T1, or more narrowly less than 5-10% of the first thickness T1.

In the illustrative example of FIGS. 3-6, each seal 66 has a unitary construction. Each seal 66 including the rails 80 can comprise a ceramic material. For example, each seal 66 is constructed from a CMC material including one or more ply layers L (FIGS. 3 and 4) of a CMC layup that define the seal body 76, rails 80 and rail apertures 82. Example CMC materials include uni-tape plies, and fibers in a resin matrix. Example fibers include organic fibers, fabrics and weaves including carbon/SiC or SiC/SiC materials.

In the illustrated example of FIG. 3, the rail apertures 82 extend through each and every one of the ply layers L defining a respective one of the rails 80. Each of the ply layers L extend outwardly from a perimeter of the respective rail aperture 82 and can be oriented substantially perpendicular to a longitudinal axis of the rail apertures 82. In other examples, the seal 66 is made of another material, including any of the materials disclosed herein, such as a high temperature metal or metal alloy.

Figure 7:
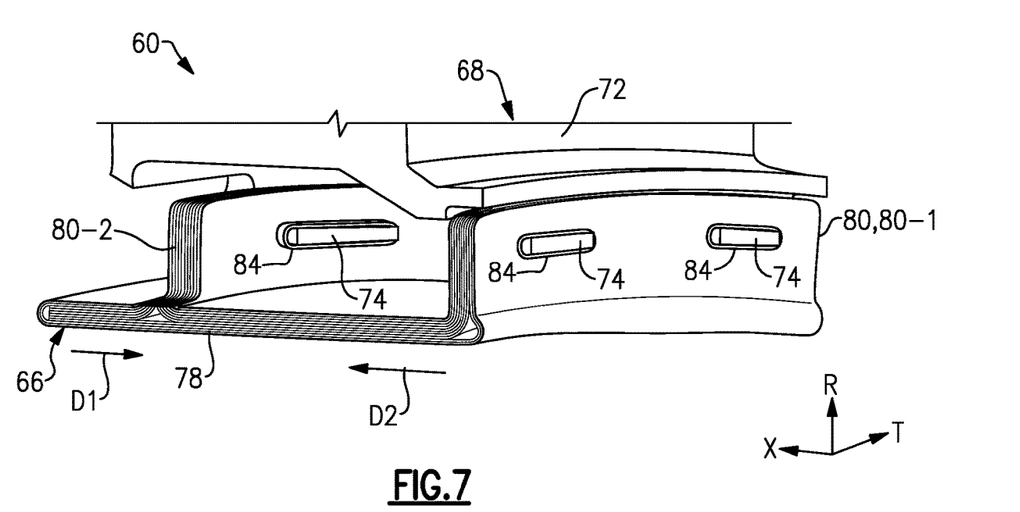
FIG. 7 is a perspective view of selected portions of the seal assembly of FIG. 3.
Figure 8:
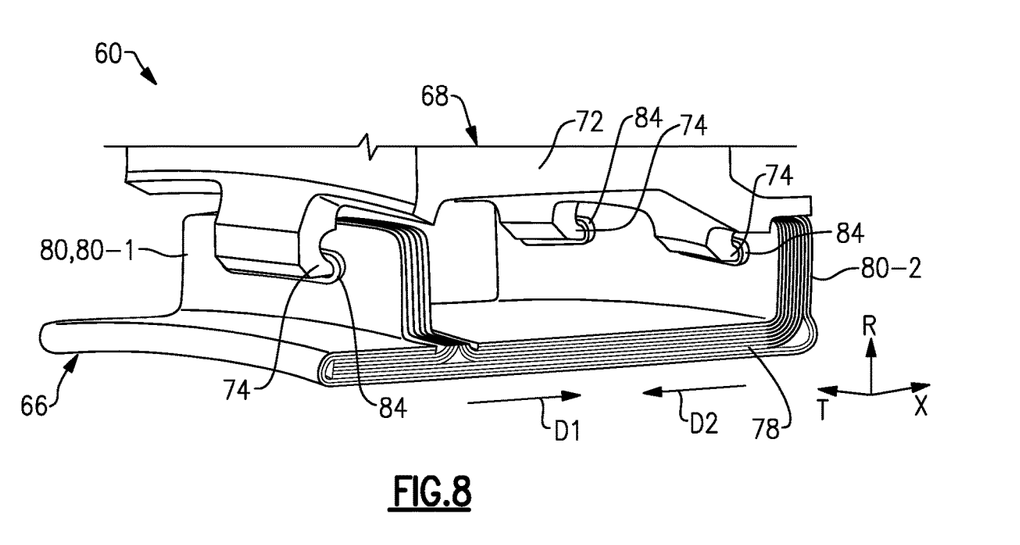
FIG. 8 is another perspective view of the seal assembly of FIG. 7.

Referring to FIGS. 4 and 7-8, with continuing reference to FIGS. 3 and 5-6, the seal assembly 60 is assembled as follows. Wear liners 84 are moved in a first direction D1 and inserted into each of the respective rail apertures 82 (FIGS. 3 and 4).

Each seal 66 together with the wear liners 84 is moved in a second direction D2 (FIGS. 7-8) such that each of the support hooks 74 is received in a respective one of the liner apertures 84D (FIG. 3) to mount the seal 66 to the seal support 68. The seal 66 is mounted to the seal support 68 such that each wear liner 84 is sandwiched between the respective support hook 74 and surfaces of the rail 80 defining the rail aperture 82, as illustrated in FIG. 3.

Figure 9:
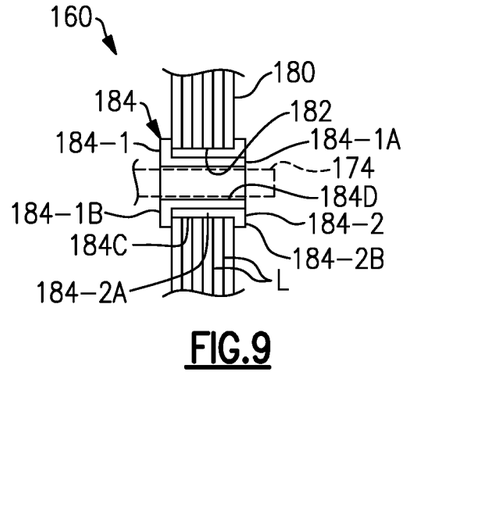
FIG. 9 illustrates a sectional view of a seal assembly according to another example.
Figure 10:
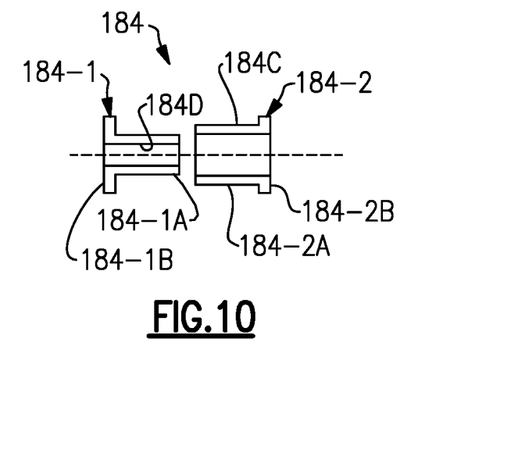
FIG. 10 illustrates an exploded view of a wear liner of the seal assembly of FIG. 9.

FIG. 9 illustrates a seal assembly 160 including a wear liner 184 according to another example. FIG. 10 illustrates an exploded view of the wear liner 184. The wear liner 184 has a multi-piece construction including first and second portions 184-1, 184-2. The first portion 184-1 includes a first body portion 184-1A extending from a first flange 184-1B. The second portion 184-2 includes a second body portion 184-2A extending from a second flange 184-2B. The first body portion 184-1A defines a liner aperture 184D. The second body portion 184-2A defines an outer periphery 184C of the wear liner 184. The first and second body portions 184-1A, 184-2A are at least partially insertable into rail aperture 182. The rail 180 can be made of a CMC material comprising a plurality of layers L that each define the rail aperture 182. The first body portion 184-1A mates with, and is at least partially insertable into, the second body portion 184-2A such that the rail 180 is sandwiched between the first and second flanges 184-1B and 184-2B.

Figure 11:
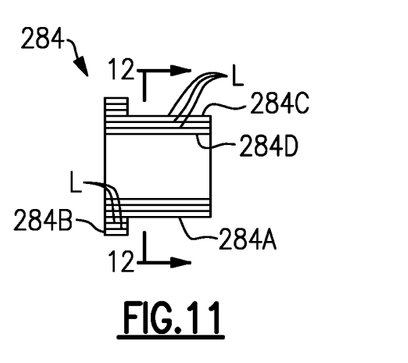
FIG. 11 illustrates a sectional view of a wear liner according to another example.
Figure 12:
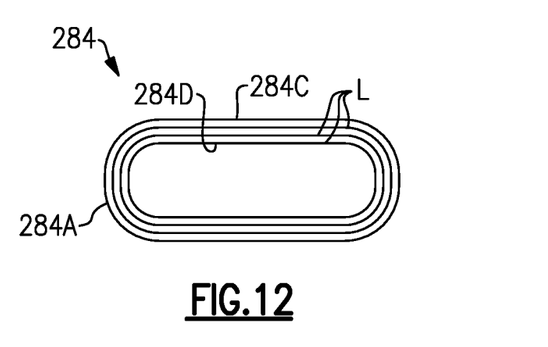
FIG. 12 illustrates a sectional view of the wear liner taken along line 12-12 of FIG. 11.
Figure 14:
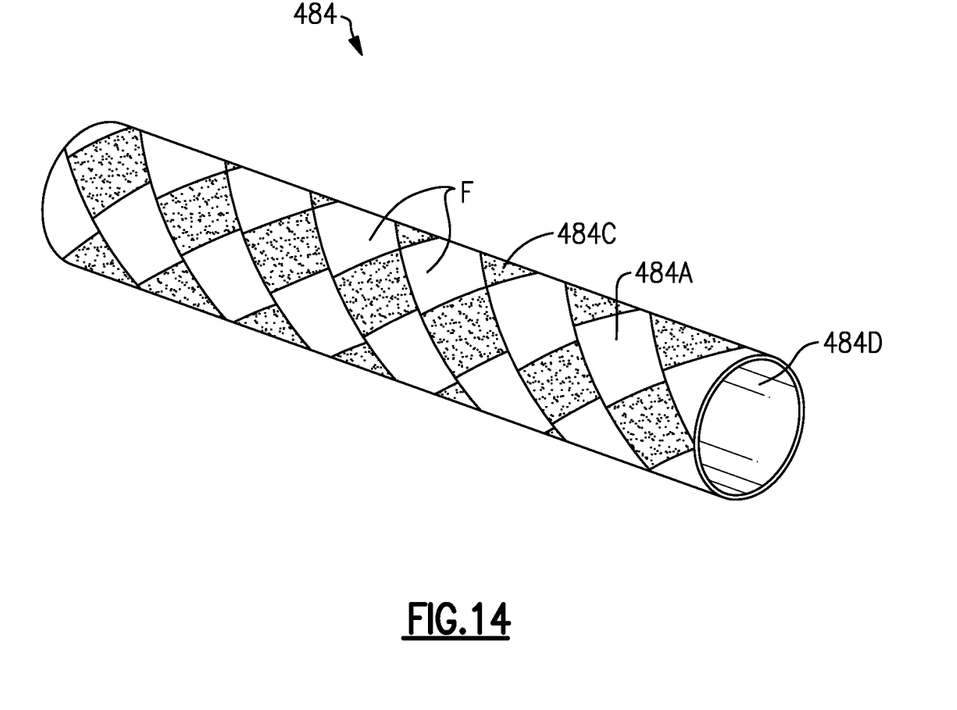
FIG. 14 illustrates a perspective view of a wear liner according to yet another example.

FIGS. 11 and 12 illustrate a wear liner 284 according to another example. The wear liner 284 is made of a CMC material comprising one or more ply layers L, including any of the materials disclosed herein. The ply layers L can be formed on a mandrel or work piece, for example, and can be dimensioned to wrap or otherwise extend about a perimeter of liner aperture 284D, as illustrated by FIG. 12. The ply layers L define portions of liner body 284A and flange 284B including an outer periphery 284C of the wear liner 284. The orientation of the ply layers L of the wear liner 284 can react loads traversely to the ply layers L defining the rails 80, 180 of FIGS. 3-9, for example. In the example of FIG. 14, wear liner 484 includes braided fibers F that extend along a length of liner aperture 484C to define a sleeve.

The seal assemblies 60, 160 and relatively ductile wear liners 84, 184, 284, 384, 484 disclosed herein can make the contact points relatively less stiff and more evenly distribution loads between the support hooks 74, 174 and seals 66, 166, including along corners of the rail apertures 82, 182, which can reduce localized stress regions or concentrations and wear adjacent the rail apertures 82, 182. The techniques disclosed herein can improve durability and life of the seals 66, 166. Redistribution of loads utilizing the wear liners 84, 184, 284, 384, 484 can reduce a likelihood of delamination of the ply layers L defining the rail apertures 82, 182.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
    a seal including a seal body extending circumferentially between opposed mate faces and at least one rail extending outwardly from the seal body, the seal body having a seal face that bounds a gas path, and wherein at least one rail aperture is defined at least partially through the at least one rail;
    at least one wear liner including a liner body, the liner body defining a liner aperture and an outer periphery that mates with the at least one rail aperture;
    a seal support mountable to an engine case, the seal support including at least one support hook that mates with the liner aperture to mount the seal to the seal support; and
    wherein the at least one support hook is made of a first material, and the liner body is made of a second material that differs in construction from the first material.

2. The seal assembly as recited in claim 1, wherein the first material has a first modulus of elasticity, and the second material has a second modulus of elasticity that is less than the first modulus of elasticity.

3. The seal assembly as recited in claim 1, wherein the at least one rail comprises ceramic, and at least one wear liner is metallic.

4. The seal assembly as recited in claim 3, wherein the at least one wear liner comprises cobalt.

5. The seal assembly as recited in claim 1, wherein the seal is a blade outer air seal (BOAS).

6. The seal assembly as recited in claim 5, wherein the seal has a unitary construction.

7. The seal assembly as recited in claim 6, wherein the seal body and the at least one rail are constructed from a ceramic matrix composite (CMC) including one or more ply layers.

8. The seal assembly as recited in claim 7, wherein:
    the at least one rail aperture includes a plurality of elongated slots that extend through the at least one rail;
    the at least one rail includes first and second rails each defining a respective one of the plurality of elongated slots; and
    the first material has a first modulus of elasticity, and the second material has a second modulus of elasticity that is between 80 percent and 98 percent of the first modulus of elasticity.

9. The seal assembly as recited in claim 8, wherein the one or more ply layers include a plurality of ply layers, and the elongated slots extend through each of the ply layers defining a respective one of the first and second rails.

10. The seal assembly as recited in claim 1, wherein the liner body includes a first body portion extending from a first flange and a second body portion extending from a second flange, the first body portion defines the outer periphery, the second body portion defines the liner aperture, and the second body portion is at least partially insertable into the first body portion such that the at least one rail is sandwiched between the first and second flanges.

11. The seal assembly as recited in claim 1, wherein the at least one wear liner is a ceramic matrix composite (CMC) comprising one or more ply layers that are each dimensioned to extend about the liner aperture.

12. A gas turbine engine comprising:
    an engine case extending along an engine longitudinal axis;
    an array of blades rotatable about the engine longitudinal axis; and
    a seal support mounted to the engine case, the seal support including a plurality of support hooks;
    an array of blade outer air seal assemblies distributed about the array of blades to bound a core flow path, wherein each of the seal assemblies comprises:
        a seal including a seal body extending circumferentially between opposed mate faces, the seal body having a seal face that bounds the core flow path and an opposed backside face, and a plurality of rail apertures defined in a pair of rails extending outwardly from the backside face;
        a plurality of wear liners received between respective ones of the support hooks and surfaces of the rail apertures to mount the seal; and
        wherein the pair of rails are constructed from a ceramic matrix composite (CMC) including a plurality of ply layers that define the rail apertures.

13. The gas turbine engine as recited in claim 12, wherein the support hooks have a first modulus of elasticity, and the wear liner comprises a second material having a second modulus of elasticity that is less than the first modulus of elasticity.

14. The gas turbine engine as recited in claim 13, wherein the first material has a first modulus of elasticity, and the second material has a second modulus of elasticity that is between 90 percent and 98 percent of the first modulus of elasticity.

15. The gas turbine engine as recited in claim 13, wherein each of the wear liners is metallic.

16. The gas turbine engine as recited in claim 12, wherein the rail apertures are a plurality of elongated slots, and the elongated slots extend through each and every one of the ply layers defining a respective one of the pair of rails.

17. A method of assembly for a gas turbine engine comprising:
    providing a blade outer air seal (BOAS) including a seal body extending circumferentially between opposed mate faces and a rail extending outwardly from the seal body, the seal body having a seal face that bounds a gas path, the rail defining a rail aperture, and the rail comprises ceramic;
    inserting a wear liner into the rail aperture, the wear liner including a liner body defining a liner aperture;
    mounting the blade outer air seal (BOAS) to a seal support, including inserting a support hook of the seal support into the liner aperture such that the wear liner is sandwiched between the support hook and surfaces of the rail defining the rail aperture; and wherein the support hook comprises a first material having a first modulus of elasticity, and the liner body comprises a second material having a second modulus of elasticity that is less than the first modulus of elasticity.

18. The method as recited in claim 17, wherein the rail is constructed from a ceramic matrix composite (CMC) including a plurality of ply layers that define the rail aperture.

19. The method as recited in claim 18, wherein the wear liner is metallic.

20. The method as recited in claim 17, further comprising fabricating the wear liner from a ceramic matrix composite (CMC) including a plurality of ply layers that extend about a perimeter of the liner aperture.

* * * * *